(12) United States Patent
Nakane

(10) Patent No.: US 9,281,004 B2
(45) Date of Patent: Mar. 8, 2016

(54) CONTENT ASSESSMENT APPARATUS, CONTENT ASSESSMENT METHOD, INFORMATION REPRODUCING APPARATUS, AND INFORMATION REPRODUCING METHOD

(75) Inventor: Kazuhiko Nakane, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1931 days.

(21) Appl. No.: 12/518,568

(22) PCT Filed: Mar. 12, 2007

(86) PCT No.: PCT/JP2007/073314
§ 371 (c)(1),
(2), (4) Date: Jul. 14, 2009

(87) PCT Pub. No.: WO2008/072497
PCT Pub. Date: Jun. 19, 2008

(65) Prior Publication Data
US 2010/0034379 A1    Feb. 11, 2010

(30) Foreign Application Priority Data

Dec. 11, 2006 (JP) ................................ 2006-333078
Sep. 20, 2007 (WO) .................. PCT/JP2007/068233
Sep. 28, 2007 (JP) ................................ 2007-253908

(51) Int. Cl.
*H04N 7/167* (2011.01)
*G11B 20/00* (2006.01)
(Continued)

(52) U.S. Cl.
CPC .......... *G11B 20/00884* (2013.01); *G06F 21/10* (2013.01); *G10L 19/00* (2013.01);
(Continued)

(58) Field of Classification Search
CPC ................................ G06F 21/10; H04N 5/913
USPC .......... 380/42, 201, 203, 236, 37; 726/26, 27, 726/30, 31
See application file for complete search history.

(56) References Cited

U.S. PATENT DOCUMENTS 5,621,794 A    4/1997  Matsuda et al.
5,878,188 A *  3/1999  Amada et al. ................. 386/221
(Continued)

FOREIGN PATENT DOCUMENTS

EP    1 032 204 A2    8/2000
EP    1 079 627        2/2001
(Continued)

*Primary Examiner* — Saleh Najjar
*Assistant Examiner* — Peiliang Pan
(74) *Attorney, Agent, or Firm* — Birch, Stewart, Kolasch & Birch, LLP

(57) ABSTRACT

A content assessment apparatus, content assessment method, information reproducing apparatus, and information recording medium are provided that can determine whether digital content has been processed abnormally. The information reproducing apparatus includes a drive (101) that reads content from an information recording medium (102) on which content including an electronic watermark, indicating an attribute denoting whether or not the content is encrypted, is recorded, a decryptor (103), a decryptor status monitor (104), a stream attribute monitor (106), a decision means (107) that determines that the content has been abnormally processed when a decryption status signal indicates otherwise than that decryption processing is being performed and an attribute detection signal indicates that the content is encrypted, or when the decryption status signal indicates that decryption processing is being performed and the attribute detection signal indicates that the content is non-encrypted, a video decoder (105), and an output control means (108) that is not allowed to output the video signal if the content has been abnormally processed.

13 Claims, 9 Drawing Sheets

(51) Int. Cl.
  *G06F 21/10* (2013.01)
  *H04N 5/85* (2006.01)
  *H04N 5/913* (2006.01)
  *G10L 19/00* (2013.01)
  *G10L 19/018* (2013.01)
  *G11B 20/10* (2006.01)
  *H04N 5/907* (2006.01)
  *H04N 9/82* (2006.01)

(52) U.S. Cl.
  CPC ...... *G11B20/0021* (2013.01); *G11B 20/00086* (2013.01); *H04N 5/85* (2013.01); *H04N 5/913* (2013.01); *G10L 19/018* (2013.01); *G11B 2020/10537* (2013.01); *H04N 5/907* (2013.01); *H04N 9/8205* (2013.01); *H04N 2005/91328* (2013.01); *H04N 2005/91335* (2013.01); *H04N 2005/91342* (2013.01); *H04N 2005/91364* (2013.01)

(56) References Cited

U.S. PATENT DOCUMENTS

| | | |
|---|---|---|
| 7,046,607 B2 | 5/2006 | Yamada |
| 7,155,013 B2 * | 12/2006 | Kihara et al. ............... 380/217 |
| 2002/0041686 A1 | 4/2002 | Moriyama et al. |
| 2002/0108043 A1 * | 8/2002 | Tanaka ........................ 713/176 |
| 2003/0120926 A1 | 6/2003 | Fukushima et al. |
| 2003/0126445 A1 * | 7/2003 | Wehrenberg ................ 713/176 |
| 2004/0039907 A1 * | 2/2004 | Sako et al. ................... 713/164 |
| 2004/0223427 A1 * | 11/2004 | Kim et al. ................. 369/47.12 |
| 2005/0013592 A1 * | 1/2005 | Umemura et al. .............. 386/96 |
| 2006/0062073 A1 | 3/2006 | Kitani et al. |
| 2006/0210074 A1 | 9/2006 | Ryu |
| 2007/0133793 A1 * | 6/2007 | Kimura ........................... 380/54 |
| 2008/0034443 A1 | 2/2008 | Nonaka et al. |
| 2010/0268965 A1 * | 10/2010 | Hug et al. ..................... 713/189 |

FOREIGN PATENT DOCUMENTS

| | | |
|---|---|---|
| EP | 1 134 964 | 9/2001 |
| EP | 1 359 580 | 11/2003 |
| EP | 1 067 540 B1 | 6/2004 |
| EP | 0 934 656 | 7/2005 |
| JP | 8-163533 A | 6/1996 |
| JP | 9-251267 A | 9/1997 |
| JP | 2000-252974 A | 9/2000 |
| JP | 2001-23298 A | 1/2001 |
| JP | 2001-229612 | 8/2001 |
| JP | 2002-24751 A | 1/2002 |
| JP | 2003-59178 A | 2/2003 |
| JP | 2003-195759 A | 7/2003 |
| JP | 2004-030882 | 1/2004 |
| JP | 2004-288280 | 10/2004 |
| JP | 2004-362721 A | 12/2004 |
| JP | 2005-271586 A | 10/2005 |
| JP | 2005-295468 A | 10/2005 |
| JP | 2006-87096 A | 3/2006 |
| JP | 2006-339988 A | 12/2006 |
| TW | 482997 B | 4/2002 |
| TW | 514873 B | 12/2002 |
| TW | 200506866 A | 2/2005 |
| TW | 200539706 A | 12/2005 |

\* cited by examiner

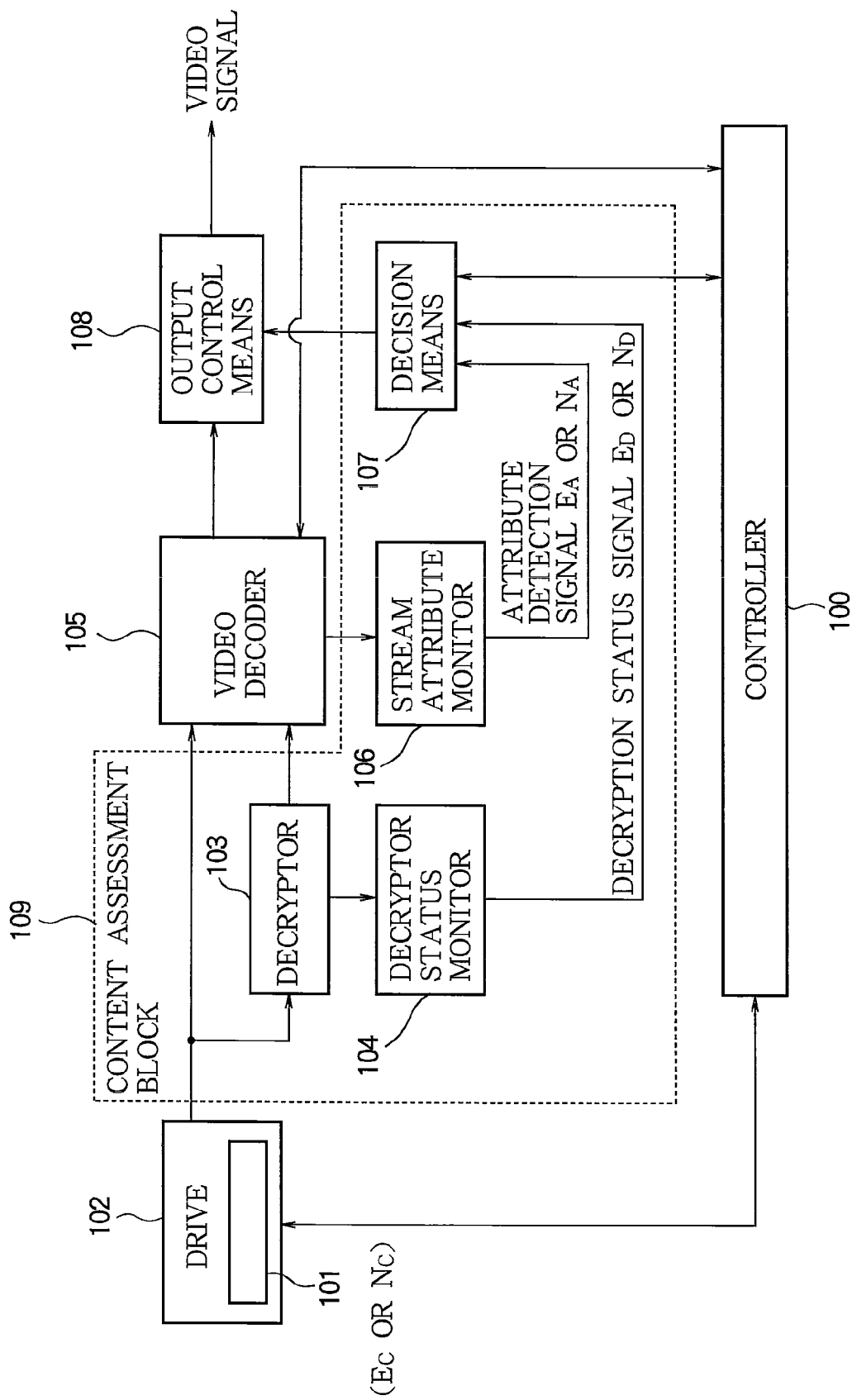

FIG.2

FIRST EMBODIMENT

| CASE | CONTENT | DECRYPTION STATUS SIGNAL | ATTRIBUTE DETECTION SIGNAL | DECISION OF DECISION MEANS | OUTPUT VIDEO |
|---|---|---|---|---|---|
| a | $N_C$ | $N_D$ | $N_A$ | NORMAL | REPRODUCED VIDEO |
| b | $N_C$ | $N_D$ | $E_A$ | ABNORMAL | NONE |
| c | $N_C$ | $E_D$ | $N_A$ | ABNORMAL | NONE |
| d | $N_C$ | $E_D$ | $E_A$ | NORMAL | ABNORMAL VIDEO |
| e | $E_C$ | $N_D$ | $N_A$ | NORMAL | ABNORMAL VIDEO |
| f | $E_C$ | $N_D$ | $E_A$ | ABNORMAL | NONE |
| g | $E_C$ | $E_D$ | $N_A$ | ABNORMAL | NONE |
| h | $E_C$ | $E_D$ | $E_A$ | NORMAL | REPRODUCED VIDEO |

$N_C, N_D, N_A$ : NON-ENCRYPTION $E_C, E_D, E_A$ : ENCRYPTION

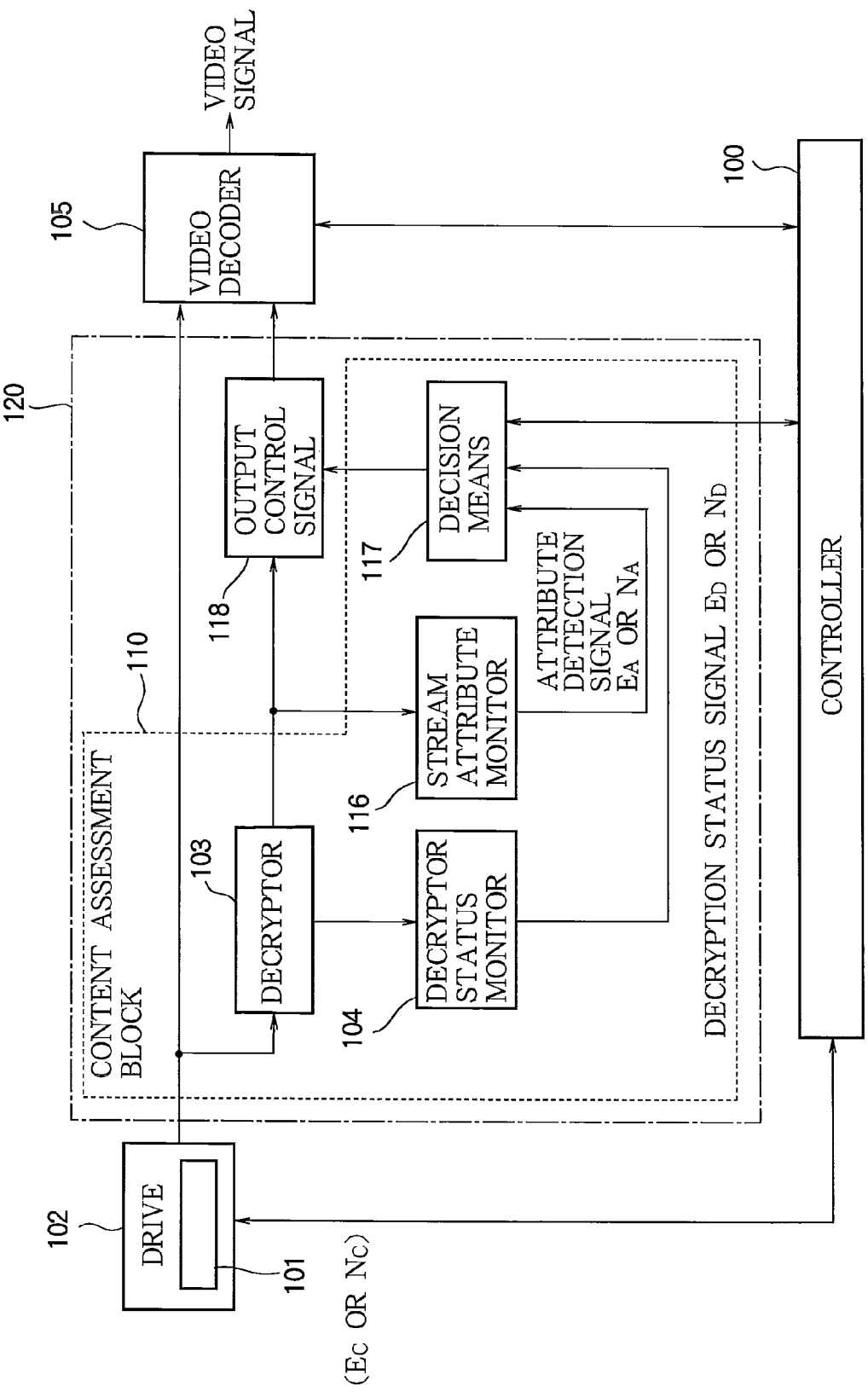

FIG. 4

SECOND EMBODIMENT

| CASE | CONTENT | DECRYPTION STATUS SIGNAL | ATTRIBUTE DETECTION SIGNAL | DECISION OF DECISION MEANS | OUTPUT VIDEO |
|---|---|---|---|---|---|
| a | $N_C$ | $N_D$ | $N_A$ | NORMAL | REPRODUCED VIDEO |
| b | $N_C$ | $N_D$ | $E_A$ | ABNORMAL | NONE |
| c | $N_C$ | $E_D$ | $N_A$ | ABNORMAL | NONE |
| d | $N_C$ | $E_D$ | $E_A$ | NORMAL | ABNORMAL VIDEO |
| e | $E_C$ | $N_D$ | $N_A$ | NORMAL | ABNORMAL VIDEO |
| f | $E_C$ | $N_D$ | $E_A$ | ABNORMAL | NONE |
| g | $E_C$ | $E_D$ | $N_A$ | ABNORMAL | NONE |
| h | $E_C$ | $E_D$ | $E_A$ | NORMAL | REPRODUCED VIDEO |

$N_C, N_D, N_A$ : NON-ENCRYPTION $E_C, E_D, E_A$ : ENCRYPTION

FIG.6

| CASE | ORIGINAL ENCRYPTION STATE OF CONTENT | ENCRYPTION STATE ON RECORDING MEDIUM | DECRYPTION STATUS SIGNAL D | DECISION | PROCESSING |
|---|---|---|---|---|---|
| Sa | Ec | Em | Ed | COPYRIGHT PROTECTION ENCRYPTION HAS BEEN CORRECTLY APPLIED | NORMAL REPRODUCTION |
| Sb | Ec | Nm | Nd | COPYRIGHT PROTECTION ENCRYPTION HAS BEEN ILLEGALLY DECRYPTED | REPRODUCTION DISABLED |
| Sc | Nc | Em | — | COPYRIGHT PROTECTION ENCRYPTION HAS BEEN ILLEGALLY ADDED | REPRODUCTION DISABLED |
| Sd | Nc | Nm | — | COPYRIGHT PROTECTION ENCRYPTION HAS BEEN CORRECTLY APPLIED | NORMAL REPRODUCTION |

CONTENT ASSESSMENT APPARATUS, CONTENT ASSESSMENT METHOD, INFORMATION REPRODUCING APPARATUS, AND INFORMATION REPRODUCING METHOD

TECHNICAL FIELD

The present invention relates to a content assessment apparatus, content assessment method, and information reproducing apparatus that can determine whether or not digital content such as video or music has been processed abnormally, and an information recording medium for reproduction by the information reproducing apparatus.

BACKGROUND ART

Copy guard techniques such as the serial copy management system (SCMS) and copy generation management system (CGMS) are used to prevent illegal acts (such as copyright infringement acts) of copying information from one information recording medium to another information recording medium. For example, two bits of copyright protection information are recorded on an information recording medium, '00' indicating that copying is possible, '10' indicating that copying is possible only once, '11' indicating that copying is prohibited. The information recording apparatus abides by the copyright protection information recorded on the information recording medium. The copyright protection information recorded on an information recording medium can be tampered with, however. Therefore, a method has been proposed that, in addition to the two bits of copyright protection information, adds the same information as given by the two bits of copyright protection information as a watermark to the digital data obtained by encoding of video information, detects both during playback, and decides whether to output the data from the decoder or to disable output according to the result of a comparison of the two (see, for example, Patent Document 1).

Another technique that is in general use for protecting copyrights on digital content is encryption of the content. In this copyright protection technique, the data to be protected are encrypted when the data are recorded, and the encryption key needed for decrypting the encrypted data and reproduction control data for copyright protection are embedded in the encrypted data as an electronic watermark. When the data are reproduced, the electronic watermark is detected, the encryption key needed for decrypting the encrypted data and reproduction control data for copyright protection are recovered, the encrypted data are decrypted by use of the recovered encryption key, and the reproduction of the copyright-protected data is controlled by the recovered reproduction control data (see, for example, Patent Document 2).

Patent Document 1: Japanese Patent Application Publication No. 2006-87096
Patent Document 2: Japanese Patent Application Publication No. 2003-195759

DISCLOSURE OF THE INVENTION

Problems to be Solved by the Invention

In the conventional methods above, the strength of the concealment of the key or the decryption procedure for decrypting the code is equivalent to the strength of the copyright protection, but these methods have harbored a weakness in that once the concealed information is deciphered, copyright protection ceases to function. If copyrighted content protected by encryption is deciphered and the digital data are converted to plaintext by a third party, for example, it becomes impossible to prevent unauthorized reproduction, copying, plagiarism, or alteration.

The present invention was devised to solve the above problems of the prior art, with the object of providing a content assessment apparatus, content assessment method, information reproducing apparatus, and information recording medium that can determine whether or not digital content such as video or music has been abnormally processed.

Another object is to provide an information reproducing apparatus and an information reproducing method that can determine whether or not digital content such as video or music has been illegally decrypted and can prevent illegally decrypted content from being reproduced normally.

Means for Solving the Problems

The content assessment apparatus in the present invention has a decryptor for, when content including an electronic watermark is encrypted, the electronic watermark indicating an attribute denoting whether or not the content is encrypted, decrypting an encrypted stream of the content, a decryptor status monitor for generating a decryption status signal indicating whether or not the decryptor is performing decryption processing, a stream attribute monitor for generating, from the electronic watermark, an attribute detection signal indicating the attribute, and a decision means for determining that the content has been abnormally processed when the decryption status signal indicates otherwise than that decryption processing is being performed and the attribute detection signal indicates that the content is encrypted, or when the decryption status signal indicates that decryption processing is being performed and the attribute detection signal indicates that the content is not encrypted.

The content assessment method in the present invention is a content assessment method in which an apparatus determines whether or not content has been processed abnormally, the content including an electronic watermark indicating an attribute denoting whether or not the content is encrypted; the content assessment method comprises a step of using a decryptor to decrypt an encrypted stream of the content, when the content is encrypted, a step of generating a decryption status signal indicating whether or not the decryptor is performing decryption processing, a step of generating, from the electronic watermark, an attribute detection signal indicating the attribute, and a step of determining that the content has been abnormally processed when the decryption status signal indicates otherwise than that decryption processing is being performed and the attribute detection signal indicates that the content is encrypted, or when the decryption status signal indicates that decryption processing is being performed and the attribute detection signal indicates that the content is not encrypted.

An information reproducing apparatus in the present invention has a reproducing means for reading content from an information recording medium on which the content is recorded, the content including an electronic watermark indicating an attribute denoting whether or not the content is encrypted, a decryptor for decrypting an encrypted stream of the content if the content is encrypted, a decryptor status monitor for generating a decryption status signal indicating whether or not the decryptor is performing decryption processing, a stream attribute monitor for generating, from the electronic watermark, an attribute detection signal indicating the attribute, a decision means for determining that the content has been abnormally processed when the decryption status signal indicates otherwise than performing decryption processing and the attribute detection signal indicates that the content is encrypted, or when the decryption status signal indicates that decryption processing is being performed and the attribute detection signal indicates that the content is not encrypted, and a video decoder for decoding, and outputting as a video signal, a stream of the content output from the reproducing means or the decryptor.

An information recording medium in the present invention is an information recording medium reproduced by the above information reproducing apparatus, and includes an electronic watermark indicating an attribute denoting whether the recorded content is encrypted or not.

Another information reproducing apparatus in the present invention has a decryptor for decrypting encrypted stream information representing video or audio that has been coded and also encrypted, a decryptor status monitor for receiving an internal signal of the decryptor and generating a decryption status signal indicating whether or not the decryptor is performing decryption processing, and a decoder for decoding the stream information; the apparatus is adapted to have the decoder perform decoding operations correctly only when the decryption status signal indicates that decryption processing is being performed.

Another information reproducing apparatus in the present invention has a decryptor for decrypting encrypted stream information representing video or audio that has been coded and also encrypted, a decryptor status monitor for receiving an internal signal of the decryptor and generating a decryption status signal indicating whether or not the decryptor is performing decryption processing, a decoder for decoding the stream information, and an output means for output of the stream information decoded by the decoder; the apparatus is adapted so that the decoded stream information is output correctly from the output means only when the decryption status signal indicates that decryption processing is being performed.

Effect of the Invention

With the content assessment apparatus, content assessment method, and information reproducing apparatus in the present invention, it is possible to determine whether content is normal or has been abnormally processed.

When content has been abnormally processed, the information reproducing apparatus in the present invention can prevent output of a video signal.

With the information recording medium in the present invention, it is possible to determine whether content is normal or has been abnormally processed.

The present invention can also determine whether or not content is normal and prevent the reproduction of content that has been illegally decrypted or is otherwise not normal.

BRIEF DESCRIPTION OF THE DRAWINGS

FIG. 1 is a block diagram schematically showing the structure of an information reproducing apparatus according to a first embodiment of the invention.

FIG. 2 explains content assessment and the output video signal in the information reproducing apparatus according to the first embodiment.

FIG. 3 is a block diagram schematically showing the structure of an information reproducing apparatus according to a second embodiment of the invention.

FIG. 4 explains content assessment and the output video signal in the information reproducing apparatus according to the second embodiment.

FIG. 6 explains the determination of the state of copyright protection of content in the information reproducing apparatus according to a third embodiment.

Figure 5:
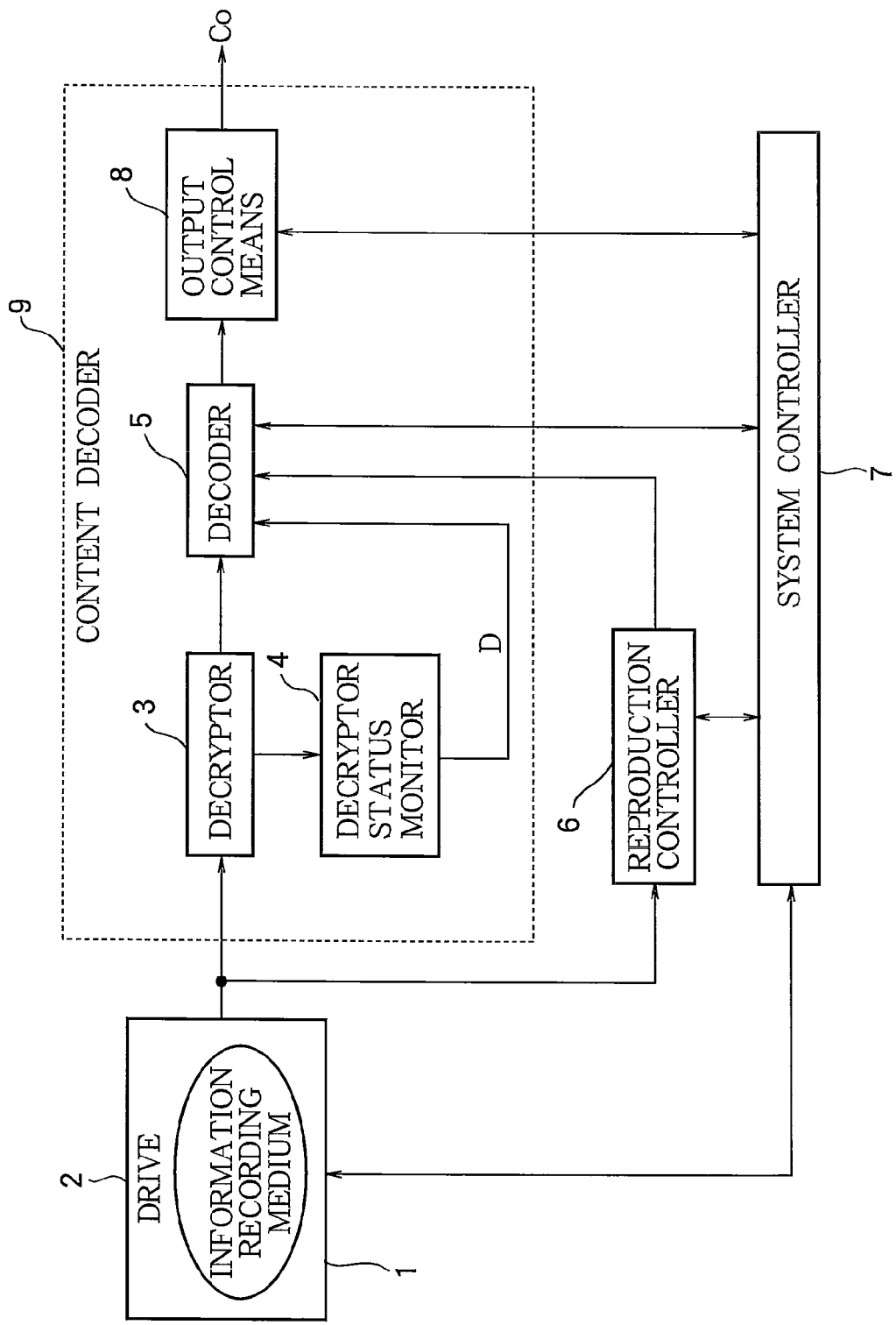
FIG. 5 is a block diagram showing the structure of an information reproducing apparatus according to a third embodiment of the invention.

DESCRIPTION OF REFERENCE NUMERALS 100 controller, 101 information recording medium, 102 drive, 103 decryptor, 104 decryptor status monitor, 105 video decoder, 106, 116 stream attribute monitor, 107, 117 decision means, 108, 118, output control means, 109, 110, content assessment block, 120 circuit block, 1 information recording medium, 2 drive, 3 decryptor, 4 decryptor status monitor, 5 video decoder, 6 reproduction controller, 7 system controller, 8 output control means, 9 content decoder, 10 another content decoder, 11 parser, 12 video buffer, 13 video encryption decryptor, 14 video encryption decryptor status monitor, 15 video decoder, 16 video encryption decoding status signal, 18 video output control means, 19 video content decoder, 22 audio buffer, 23 audio encryption decryptor, 24 audio encryption decryptor status monitor, 25 audio decoder, Da audio signal decryption status signal, 28 audio output control means, 29 audio content decoder, 32 control buffer.

BEST MODE FOR CARRYING OUT THE INVENTION

First Embodiment

FIG. 1 is a block diagram schematically showing the structure of an information reproducing apparatus according to a first embodiment of the invention.

The information reproducing apparatus according to the first embodiment reproduces video and/or audio from an information recording medium 101 on which digital content is recorded; the digital content includes an electronic watermark indicating an attribute denoting whether or not the digital content itself is encrypted. The information recording medium 101 is an optical disc such as a DVD or CD, or a memory card. Encryption is carried out for copyright protection to protect digital content such as video or audio from being illegally reproduced or copied by an unauthorized person. For example, CPRM (Content Protection for Recordable Media) and AACS (Advanced Access Content System), which have been established for copyright protection, can be used as the encryption system. Encryption for copyright protection need not be carried out on control information (e.g., navigation control information) included in the content recorded on the information recording medium.

As shown in FIG. 1, the information reproducing apparatus according to the first embodiment has a controller 100 that controls the operation of the entire apparatus, a drive 102 used as a reproducing means for reading content from an information recording medium 101, a decryptor 103 that decodes (decrypts) an encrypted stream of the content if the content is encrypted, and a decryptor status monitor 104 that generates a decryption status signal indicating whether or not the decryptor 103 is performing decryption processing. The decryption status signal is $E_D$ when the decryptor 103 is performing decryption processing, and $N_D$ when the decryptor 103 is not performing decryption processing. The content has an attribute, embedded at the time of authoring in a manner that is not easily tampered with, indicating whether or not the data that are about to be reproduced are encrypted for copyright protection. The attribute is embedded in the content stream by use of, for example, an electronic watermark.

The information reproducing apparatus according to the first embodiment also has a video decoder 105 that decodes (decodes the encoded data of) the content stream output from the drive 102 or the decryptor 103 and outputs it as a video signal, and a stream attribute monitor 106 that generates, from the electronic watermark, an attribute detection signal indicating the attribute. The attribute detection signal is $E_A$ if the watermark indicates encryption, and $N_A$ if the watermark indicates non-encryption.

The information reproducing apparatus according to the first embodiment furthermore has a decision means 107 that determines that the content has been abnormally processed (for example, illegally processed with respect to copyright protection) when the decryption status signal indicates a state other than that decryption processing is being performed ($N_D$) and the attribute detection signal indicates that the content is encrypted ($E_A$), or when the decryption status signal indicates that decryption processing is being performed ($E_D$) and the attribute detection signal indicates that the content is not encrypted ($N_A$).

The information reproducing apparatus according to the first embodiment also has an output control means 108 that disables output of the video signal from the video decoder 105 when the decision means 107 determines that the content has been processed abnormally. The 'decryption' carried out by the decryptor 103 is a process that decrypts data encrypted for copyright protection, and the 'decoding' carried out by the video decoder 105 is the process that converts the encoded data to the original data.

As indicated in FIG. 1, the decryptor 103, decryptor status monitor 104, stream attribute monitor 106, and decision means 107 constitute a content assessment block 109 equivalent to the content assessment apparatus according to the first embodiment of the invention (equivalent, that is, to an apparatus for carrying out the content assessment method according to the first embodiment of the invention). The result of the assessment by the content assessment block 109 can be output from a display means or loudspeaker (not shown) as a display or an audible alarm.

FIG. 2 explains the content assessment conditions and output video signal in the information reproducing apparatus according to the first embodiment.

As shown in FIG. 2, eight cases (cases a to h) may be considered, representing combinations of the state of encryption of the content (non-encrypted $N_C$ or encrypted $E_C$), the decryption status signal (non-encryption $N_D$ or encryption $E_D$), and the attribute detection signal (non-encryption $N_A$ or encryption $E_A$). Note that the information reproducing apparatus cannot accurately know the encryption state of the content (non-encrypted $N_C$ or encrypted $E_C$), because the encryption state of the content shown in FIG. 2 denotes the original state of the content recorded on the information recording medium 101, but the content may have been altered.

(a) In case a, the content is not encrypted ($N_C$), the decryption status signal indicates non-encryption ($N_D$), and the attribute detection signal indicates non-encryption ($N_A$). In this case, the content was not originally encrypted and the decryption status signal and the attribute detection signal both indicate that the content is not encrypted, so it can be inferred that the content has not been tampered with. Because the decryption status signal and attribute detection signal both indicate non-encryption ($N_D$ and $N_A$), the decision means 107 decides that the content has not undergone illegal processing, that is, that the content is 'normal'. On the basis of this decision by the decision means 107, the output control means 108 outputs the unaltered output signal of the video decoder 105 as the video signal.

(b) In case b, the content is not encrypted ($N_C$) and the decryption status signal indicates non-encryption ($N_D$) but the attribute detection signal indicates encryption ($E_A$). In this case, the content is intrinsically not encrypted and the decryption status signal indicates that the content is not encrypted but the attribute detection signal indicates that the content is encrypted, so it can be inferred that the content has been tampered with (e.g., the content has been illegally decrypted and converted to plaintext). Because the decryption status signal indicates non-encryption ($N_D$) but the attribute detection signal indicates encryption ($N_A$), the decision means 107 decides that the content has undergone illegal processing, that is, that the content is 'abnormal'. On the basis of this decision by the decision means 107, the output control means 108 blocks the output signal of the video decoder 105 and does not output the video signal.

(c) In case c, the content is not encrypted ($N_C$) and the decryption status signal indicates encryption ($E_D$) but the attribute detection signal indicates non-encryption ($N_A$). In this case, the decryptor 103 is executing decryption processing on plaintext data, and the data will not be decrypted normally. Because the decryption status signal indicates encryption ($E_D$) but the attribute detection signal indicates non-encryption ($N_A$), the decision means 107 decides that the content has undergone illegal processing, that is, that the content is 'abnormal'. On the basis of this decision by the decision means 107, the output control means 108 blocks the output signal of the video decoder 105 and does not output the video signal.

(d) In case d, the content is not encrypted ($N_C$) but the decryption status signal indicates encryption ($E_D$) and the attribute detection signal indicates encryption ($E_A$). In this case, the decryptor 103 executes decryption processing on plaintext data, and the data will not be decoded normally. Ordinarily case d cannot occur. Nevertheless, because the decryption status signal indicates encryption ($E_D$) and attribute detection signal ($E_A$) also indicates encryption, the decision means 107 decides that the content has not undergone illegal processing, that is, that the content is 'normal'. The user, however, can tell by looking at the screen that something is wrong, and presumably will halt reproduction manually.

(e) In case e, the content is encrypted ($E_C$), but the decryption status signal indicates non-encryption ($N_D$) and the attribute detection signal indicates non-encryption ($N_A$). In this case, the decryptor 3 does not decrypt the encrypted data, and a normal image is not output. Ordinarily case e cannot occur. Nevertheless, because the decryption status signal ($N_D$) and the attribute detection signal ($N_A$) both indicate non-encryption, the decision means 107 decides that the content has not undergone illegal processing, that is, that the content is 'normal'. The user, however, can tell by looking at the screen that something is wrong, and presumably will halt reproduction manually.

(f) In case f, the content is encrypted ($E_C$), but the decryption status signal indicates non-encryption ($N_D$) and the attribute detection signal indicates encryption ($E_A$). In this case, the decryptor 103 does not decrypt the encrypted data, and a normal image is not output. Because the decryption status signal indicates non-encryption ($N_D$) and the attribute detection signal indicates encryption ($E_A$), the decision means 107 decides that the content has undergone illegal processing, that is, that the content is 'abnormal'. On the basis of this decision by the decision means 107, the output control means 8 blocks the output signal of the video decoder 105 and the video signal is not output.

(g) In case g, the content is encrypted ($E_C$) and the decryption status signal indicates encryption ($E_D$) but the attribute detection signal indicates non-encryption ($N_A$). In this case, the attribute in the electronic watermark may be erroneous. Ordinarily case g cannot occur. Because the decryption status signal indicates encryption ($E_D$) but attribute detection signal indicates non-encryption ($N_A$), the decision means 107 decides that the content has undergone illegal processing, that is, that the content is 'abnormal'. On the basis of this decision by the decision means 107, the output control means 8 blocks the output signal of the video decoder 105 and does not output the video signal.

(h) In case h, the content is encrypted ($E_C$), and the decryption status signal ($E_D$) and the attribute detection signal ($E_A$) both indicate encryption. In this case, the content was originally encrypted and the decryption status signal and the attribute detection signal both indicate that the content is encrypted, so it can be inferred that the content has not been tampered with. Because the decryption status signal and the attribute detection signal both indicate encryption ($E_D$ and $E_A$), the decision means 107 decides that the content has not undergone illegal processing, that is, that the content is 'normal'. On the basis of this decision by the decision means 107, the output control means 108 outputs the unaltered output signal of the video decoder 105 as a video signal.

In the above cases a to h, on the basis of the decision by the decision means 107, the output control means 108 controls whether or not to output the video signal from the video decoder 105. Alternatively, the output control means 108 can control the drive 2 to enable or disable reproduction.

As explained above, in the information reproducing apparatus (or content assessment method, or content assessment apparatus) in the first embodiment, or when the information recording medium 101 of the first embodiment is played by the information reproducing apparatus, a reproduction output control signal indicating whether to reproduce or to halt reproduction is sent from the decision means 107 to the output control means 108; the output control means 108 receives the video output signal decoded by the video decoder 105 and outputs the video output signal externally only when the reproduction output control signal permits reproduction. The controller 100 controls reproduction while detecting the status of the content assessment block 109, which is the entire video decoder, including the output control means 108. Because the system is configured in this way, if content protected by encryption has been illegally decrypted and converted to plaintext, the illegal decryption can be correctly detected when the data stream is input, and reproduction of the illegally processed content can be prevented.

Since the reproduction of illegally decrypted streams can be prevented according to the first embodiment, illegal copying of the content by use of the reproduced video output signal can also be prevented.

Second Embodiment

FIG. 3 is a block diagram schematically showing the structure of an information reproducing apparatus according to a second embodiment of the invention. Elements in FIG. 3 that are identical to or correspond to elements in FIG. 1 have the same reference characters. The information reproducing apparatus in the second embodiment differs from the information reproducing apparatus in the first embodiment in that the output control means 118 is disposed between the decryptor 103 and the video decoder 105 and the stream attribute monitor 116 detects the attribute from the output of the decryptor 103.

In actual apparatus, if the copyright protection function is to operate effectively, the processing block that carries out decryption processing for the copyright protection code, detects illegal decryption, and makes decisions on or performs control of the halting of reproduction must be securely protected so that its signals cannot be analyzed or tampered with from the outside. Specifically, if implemented in an LSI or by software with equivalent functions, it must be designed to prevent tampering. In some cases it is convenient to concentrate the protection for that purpose on the part to be protected. Compared with the information reproducing apparatus in the first embodiment, the information reproducing apparatus in the second embodiment places the processing block that detects illegal decryption, and makes decisions on and performs control of the halting of reproduction, in the same LSI circuit block 120 as the decryptor 103.

In FIG. 3, the stream attribute monitor 116 monitors the output from the decryptor 103 to obtain the information necessary to recover the electronic watermark, recovers the attribute indicating whether the video data that is being reproduced at the time should have been encrypted for copyright protection or not, and outputs it as an attribute detection signal. The decryption status signal and attribute detection signal thus obtained are input to the decision means 117, which decides whether the content that is being reproduced has undergone illegal decryption.

FIG. 4 explains content assessment and the output video signal in the information reproducing apparatus according to the second embodiment. As shown in FIG. 4, the decisions made in the decision means 117 are the same as shown in FIG. 2. As a result of these decisions, a reproduction output control signal indicating whether to carry out or halt reproduction is sent from the decision means 117 to the output control means 118. The output control means 118 receives the decrypted data sent from the decryptor 103 to the video decoder 105, and outputs the data to the video decoder 105 only when the reproduction output control signal allows reproduction.

Comparing the output control means 118 of the second embodiment and the output control means 108 of the first embodiment, one sees that the output control means 108 of the first embodiment can block all video signals output from the video decoder, while the output control means 118 can only block the output from the decryptor 103. A comparison of FIGS. 2 and 4 shows that the output video differs in cases b and f. In case b in FIG. 4, since the content was originally non-encrypted, no problem arises when the reproduced video is output. In case f in FIG. 4, since the encrypted content is not decrypted by the decryptor, only abnormal video is displayed, presumably raising no copyright issues.

As explained above, in the information reproducing apparatus (or content assessment method, or content assessment apparatus) of the second embodiment, or when the information recording medium 101 of the second embodiment is played by the information reproducing apparatus, if content protected by encryption has been illegally decrypted and converted to plaintext, the illegal decryption can be correctly detected when the data stream is input, and reproduction of the illegally processed content can be prevented.

In regard to points other than the above, the second embodiment is identical to the first embodiment.

Third Embodiment

The information reproducing apparatus in the third embodiment reproduces information such as video and audio from an information recording medium on which digital content such as video and audio is recorded. The information recording medium is an optical disc such as a DVD or CD, or a memory card. The apparatus is also applicable when the information recording medium is remote from the apparatus, and the digital content data are electrically transmitted from the remote location to the apparatus. The digital video, audio, or other content is expressed in a coded form, and the coded content has been further encrypted for copyright protection to prevent illegal reproduction or copying by an unauthorized person. An encryption system such as CPRM and AACS, which have been established for copyright protection of content on optical discs, may be used. All of the digital content recorded on the information recording medium need not to be encrypted for copyright protection; information other than video data or audio data included in the content recorded on the medium, such as control information (e.g., navigation control information), need not be encrypted for copyright protection.

FIG. 5 is a block diagram showing the structure of an information reproducing apparatus according to a third embodiment of the invention. As shown, the information reproducing apparatus according to the third embodiment has a system controller 7 that controls the operation of the entire apparatus, a drive 2 used as a reproducing means for reading content from the information recording medium 1, a decryptor 3 that decodes (decrypts) the encrypted stream including the encrypted part of the content, and a decryptor status monitor 4 that generates a decryption status signal indicating whether or not the decryptor 3 is performing decryption processing.

The decryptor 3 that decrypts the encryption code generally includes an encrypted data register that holds encrypted data to be decrypted, an encryption key register that holds encryption key data for decrypting the code, a decryption circuit for decrypting the code by performing certain logic operations on these data, and a decrypted data register that holds the decrypted result as plaintext data. Within these registers and decryption circuits, timing signals are issued at least when the data to be decrypted are sequentially loaded into the encrypted data register and when the decrypted result is sequentially stored in the decrypted data register. If the decryption circuit has to perform a plurality of processing steps, timing signals are issued to transfer intermediate data between steps.

Internal signals of the decryptor 3, such as these timing signals, are led out to the decryptor status monitor 4. From these internal signals, the decryptor status monitor 4 determines whether or not the decryptor 3 is performing decryption and outputs the result as a decryption status signal D. The decryption status signal D indicates a value (or state) Ed when the decryptor 3 is performing decryption processing, and a value (or state) Nd when the decryptor 3 is not performing decryption processing.

The use of timing signals is one exemplary method for generating the decryption status signal D; the internal signals of the decryptor 3 used to decide whether or not the decryptor 3 is performing decryption processing can be selected according to the encryption system or decryption method as a design choice.

As an example of a different encryption-decryption system, a configuration may be considered in which the decryptor 3 always executes decryption processing but the decryption circuit lets non-encrypted data pass through, by passing the data in the encryption data register to the decrypted data register without alteration, if and only if the data set in the encryption key register are identity element data; in this case, the internal signals led out from the decryptor 3 and input to the decryptor status monitor 4 may be the data in the encryption key register, or a signal that indicates whether or not the data in the encryption key register match the identity element data.

The information reproducing apparatus according to the third embodiment also has a video decoder 5 that decodes (decodes the encoded data of) the decrypted stream of content output from the decryptor 3 and outputs decoded data such as video and audio data, an output control means 8 that reproduces and outputs the decoded data of the content output from the video decoder 5 as video or audio content, and a reproduction controller 6 that receives navigation control information included in the digital content and controls reproduction of the content.

The navigation control information detected by the reproduction controller 6 includes the location of the content to be reproduced next and setting information applicable when content is reproduced. The system controller 7 processes this information, transmits the processed information to the drive 2 as access commands for access to the information recording medium 1, to the video decoder 5 as control instructions for decoding control, and to the output control means 8 as setting commands, and these blocks return corresponding responses. The content output signal output from the output control means 8 is converted to image or sound and output from an image displaying means such as a monitor or an audio transducer means such as a loudspeaker (not shown).

In this application document, the 'decryption' carried out by the decryptor 3 is a process that decrypts data encrypted for copyright protection, and the 'decoding' carried out by the video decoder 5 is a process that converts the encoded data of encoded video or audio content to the original data.

The content reproduced by the information reproducing apparatus structured as above will be described using FIG. 6. Among digital content, the critical data requiring copyright protection are video data and audio data. Considering that the video data or audio data may be partly encrypted and partly non-encrypted, and that the encrypted part may remain protected, or may have been illegally decrypted and recorded on the information recording medium in plaintext form, without encryption, the relation between the original encrypted/non-encrypted state (encrypted Ec or non-encrypted Nc) and the encrypted/non-encrypted state of the data on the information recording medium (encrypted Em or non-encrypted Nm) will be one of the four cases Sa, Sb, Sc, Sd shown in FIG. 6.

In case Sa, content that should originally have been encrypted is correctly encrypted on the information recording medium. Its copyright protection is normal, so it may be reproduced without problem.

In case Sb, content that should originally have been encrypted is not correctly encrypted on the information recording medium. It can be regarded as content that has been illegally decrypted and recorded on the information recording medium as plaintext, without encryption. It can be inferred that copyright protection has been violated, so reproduction is disabled.

In case Sc, content that originally should not have been encrypted is encrypted on the information recording medium. It can be inferred that encryption for copyright protection has been added by some type of data manipulation. It can be inferred that copyright protection has been illegally applied, so reproduction is disabled.

In case Sd, content that originally should not have been encrypted is not encrypted on the information recording medium. The content can be reproduced normally without copyright protection problems.

When the encrypted/non-encrypted state on the information recording medium is the non-encrypted state Nm, since there are two cases as to the original encrypted/non-encrypted state, these being the encrypted state Ec (case Sb) and the non-encrypted state Nc (case Sc), in order to permit content that originally should not have been encrypted to be reproduced while protecting copyright by disabling the reproduction of illegally decrypted content, it becomes necessary to know through other means (or information) whether the original encrypted/non-encrypted state was the encrypted state Ec or the non-encrypted state Nc. Even if some such means of notification is provided, if the original encrypted or non-encrypted state notification means (information) is circumvented by illegal decryption, the risk of copyright protection failure remains.

As an example of the above 'means (or information) for notification of the encrypted/non-encrypted state', digital information denoting the encrypted/non-encrypted state may be embedded as control information in the video and audio information, or may be embedded as an 'electronic watermark'.

The purpose of the reproducing apparatus of the present invention is to reproduce content that should originally have been encrypted. This means that as the original encrypted/non-encrypted state prescribed for encryption of the content, the information reproducing apparatus of the present invention only allows the encrypted state Ec. The risk that copyright protection may be circumvented and content illegally reproduced by illegal decryption of the means of indicating the encrypted/non-encrypted state can thereby be eliminated.

When content in which the video data and audio data are all encrypted as described above are reproduced, the video data and audio data of the digital content read from the drive 2 are input to the decryptor 3. A decryptor status monitor 4 that receives an internal signal of the decryptor 3 and generates a decryption status signal D that indicates whether the decryptor 3 is performing decryption processing on data encrypted for copyright protection is connected to the decryptor 3. As shown in cases Sa and Sb in FIG. 6, the decryption status signal D indicates Ed when the decryptor 3 is performing decryption of content the encrypted/non-encrypted state of which on the recording medium is the encrypted state Em, and indicates Nd when the decryptor 3 is performing decryption of content the encrypted/non-encrypted state of which on the recording medium is the non-encrypted state Nm.

The decryption status signal D is sent to the video decoder 5. The video decoder 5 carries out normal processing to decode content for which the decryption status signal D output from the decryptor status monitor 4 during the decryption processing in the decryptor 3 indicates Ed (that is, for which the decryptor status monitor 4 outputs a decryption status signal D with the value Ed). It does not carry out processing, however, to decode content for which the decryption status signal D output from the decryptor status monitor 4 during the decryption processing in the decryptor 3 indicates Nd (that is, for which the decryptor status monitor 4 outputs a decryption status signal D with the value Nd). This disables the reproduction of illegally decrypted content.

The advantages of carrying out copyright protection in the course of the decoding processing in the video decoder 5 are that the decryptor 3, the decryptor status monitor 4, and the video decoder 5 can be placed in a single LSI chip because they are circuits used for a continuous series of digital data processing, and that these three blocks can be easily integrated in an LSI because they are neighboring circuits, as indicated by the dotted line surrounding them as a content decoder 9 in FIG. 5, making it easy to avoid illegal alteration or illegal monitoring for the purpose of tampering with the decryption status signal D etc. from the outside.

In this embodiment, control information other than video data or audio data in the digital content recorded on the information recording medium, such as navigation control information, is not encrypted for copyright protection because it is sent to the reproduction controller 6 instead of being input to and processed by the decryptor 3.

The information reproducing apparatus according to the present invention has been described above as being for the purpose of reproducing content that should originally have been encrypted and as allowing only the encrypted state Ec as the original encrypted/non-encrypted state; a specific example of the criteria for determining the encrypted/non-encrypted state of the content will now be described.

Video data comprise a continuous series of frames arranged in temporal sequence, twenty-four to thirty frames per second, each frame expressing the video content at a given instant as a still picture. MPEG technology is generally used to encode video data. In MPEG, a consecutive series of a predetermined number of frames (e.g., 15 frames) is grouped and encoded as a unit. The first frame in the group, referred to as a reference frame, is encoded independently; the other frames in the group are encoded by referring to the reference frame or another frame and coding the difference values.

From the viewpoint of the strength of copyright protection, when such video data are encrypted, it would be most desirable to encrypt the entire encoded data stream. However, when the encryption and decryption processing load, that is, the amount of calculation and the cost of designing and implementing the circuits and software to carry out the calculation, is considered together with the strength of the encryption, it is not always optimal to encrypt the entire data stream. For example, it is possible to encode only a predetermined part of a frame or only the data of predetermined frames in one group of frames, or to designate groups occurring at predetermined intervals for encryption.

When content that has been encrypted at certain intervals like this, intermittently, for example, is reproduced, the timing at which the decryptor status monitor 4 monitors the decryption status is related to the selection and arrangement of the parts of the video data that are to be encrypted. While still having the decryption status signal D indicate the value Nd for content that has been illegally decrypted, it is then necessary to have the decryption status signal D correctly indicate the value Ed for content that has been partly (intermittently) encrypted according to a legitimate prescription, without incorrectly indicating the value Nd. The decision as to the decryption status is therefore designed to be made after monitoring whether or not the decryptor 3 is performing decryption processing over an interval including at least one designated-for-encryption part of the video. For example, the apparatus is designed so that if the internal signal of the decryptor 3 indicates that the decryptor 3 is performing decryption processing for even one moment, or for at least a predetermined time, in the interval including at least one designated-for-encryption part of the video data, the decryptor status monitor 4 decides that the decryptor 3 is performing decryption processing, and the video decoder 5 carries out normal decoding processing to decode the content.

In an alternative method, the video decoder 5 is designed to observe the decryption status signal D from the decryptor status monitor 4, and at the stage at which the decision is made whether or not to carry out normal the decoding process to decode the content, to make this decision after observing the decryption status signal D for a period including at least one part of the video data that would originally have been encrypted. For example, the video decoder 5 is designed so that if the decryption status signal D indicates the value Ed for even one moment, or for at least a predetermined time, in the interval including at least one part of the video data that would originally have been encoded, the video decoder 5 decides that the decryptor 3 is performing decryption processing and carries out normal decoding processing on the content to decode it.

By these methods, even when encryption of only certain parts of the video data in the content is prescribed, reproduction of legitimate content is not interrupted by an erroneous decision, while reproduction of illegally decrypted content is disabled.

The purpose of the information reproducing apparatus of the present invention to reproduce content that should originally have been encrypted; when the information reproducing apparatus attempts to reproduce content from an information recording medium, if content that should not originally have been encrypted is recorded in an encrypted form, reproduction is enabled, while if content that should not have been encrypted is recorded in a non-encrypted form, reproduction is disabled.

As explained above, according to the information reproducing apparatus (or content assessment method, or content assessment apparatus) in the third embodiment, the decryption status signal D used to control the enabling and disabling of reproduction is sent directly from the decryptor status monitor 4 to the video decoder 5, and based on this signal, the video decoder 5 directly decides whether the encoded data signal decrypted by the decryptor 3 is to be decoded as content or not. With this type of system configuration it is difficult to tamper with the system, greatly reducing the risk of illegal decryption or reproduction of content. Because the system is configured in this way, if content that should have been protected by encryption has been illegally decrypted and converted to plaintext, the system can correctly detect the illegal decryption when the data stream is input, and can block the reproduction of the illegally processed content.

Since the reproduction of illegally decrypted streams can be prevented according to the third embodiment, illegal copying of the content by use of the reproduced video output signal can be prevented.

Fourth Embodiment

Figure 7:
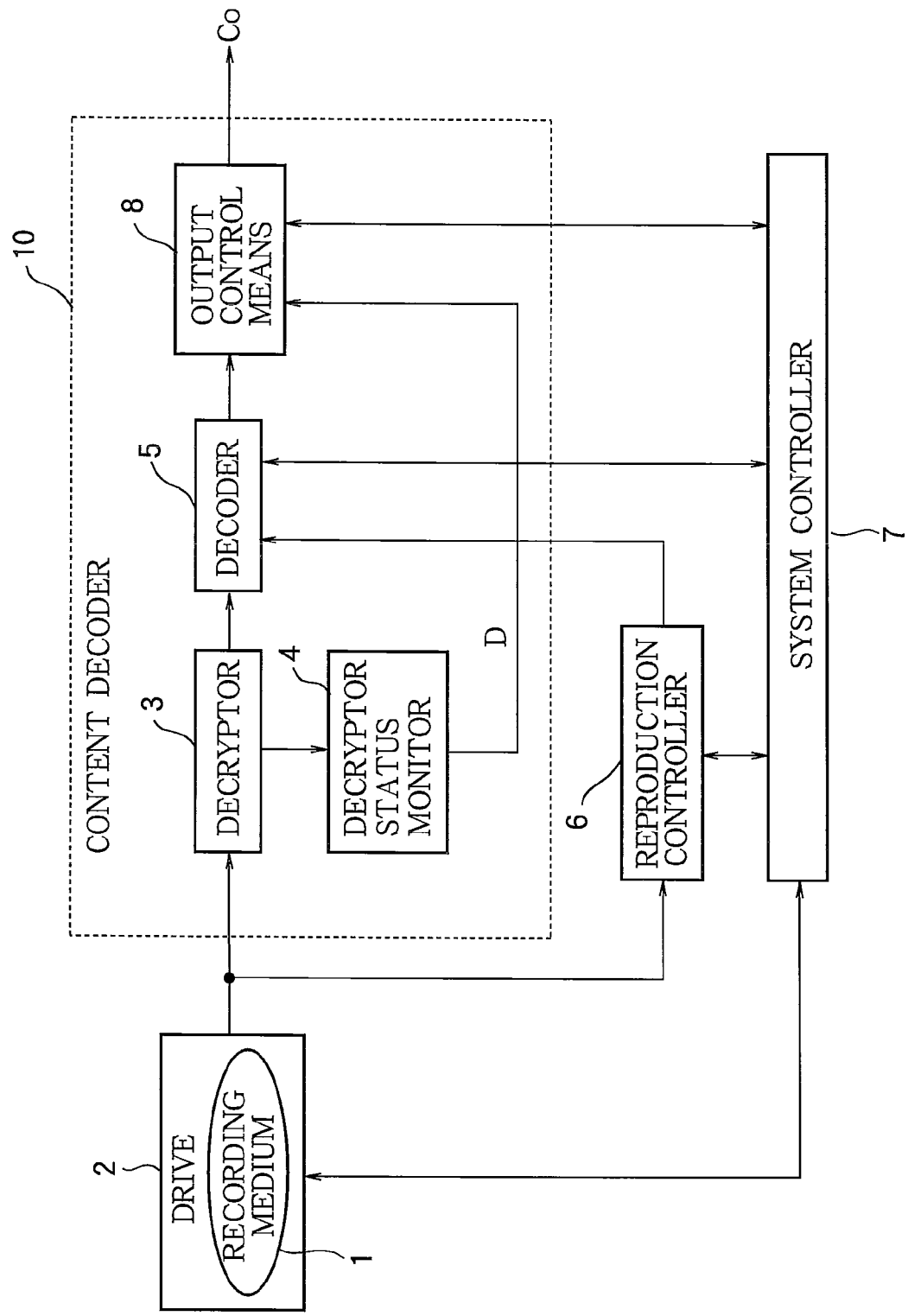
FIG. 7 is a block diagram showing the structure of an information reproducing apparatus according to a fourth embodiment of the invention.

FIG. 7 is a block diagram showing the structure of an information reproducing apparatus according to a fourth embodiment of the invention. The information reproducing apparatus according to a fourth embodiment of the invention has a structure generally similar to that of the information reproducing apparatus described in the third embodiment, but differs in regard to the connection destination of the decryption status signal D output by the decryptor status monitor 4. The description will accordingly focus on the difference from the third embodiment. Blocks in FIG. 7 that are indicated by the same numerals as in FIG. 5 have the same functions.

Whereas the decryption status signal D was sent to the video decoder 5 in FIG. 5, in FIG. 7 it is sent to the output control means 8. For content for which the decryption status signal output from the decryptor status monitor 4 has the value Ed during decryption processing in the decryptor 3, the output control means 8 reproduces the decoded data of the content output from the video decoder 5 normally and outputs it as video or audio content. For content for which the decryption status signal D output from the decryptor status monitor 4 has the value Nd during decryption processing in the decryptor 3, however, reproduction and output as video or audio content of the decoded data of the content output from the video decoder 5 is disabled. The reproduction of illegally decrypted content is thereby disabled.

When content that has been encrypted at certain intervals, intermittently, for example, as described in relation to the third embodiment is reproduced and the output control means 8 observes the decryption status signal D from the decryptor status monitor 4 and decides whether or not to reproduce and output, as video or audio content, the decoded data of the content from the video decoder 5, it is designed to make this decision by observing the decryption status signal D over an interval including at least one designated-for-encryption part of the video data. For example, it is designed so that when the decryption status signal D indicates the value Ed for even a moment, or for at least predetermined period, in the interval including at least one designated-for-encryption part of the video data, the output control means 8 decides that the decryptor 3 is performing decryption processing, and carries out reproduction and output of the decoded data from the video decoder 5.

Thus even when encryption of only certain parts of the video data of the content is prescribed, reproduction of legitimate content is not interrupted by an erroneous decision, while reproduction of illegally decrypted content is disabled.

Ease of design when the functions of the present invention are added to an existing LSI can be cited as an advantage of carrying out copyright protection in the course of processing in the output control means 8. When there is already an IP (Intellectual Property) module available as the video decoder 5, copyright protection can be enhanced without re-designing the video decoder 5. In this case, the four blocks shown in FIG. 7 as another content decoder 10 surrounded by a dotted line, including the decryptor 3, decryptor status monitor 4, video decoder 5, and output control means 8, are integrated in an LSI to avoid illegal alteration or illegal monitoring for the purpose of tampering with the decryption status signal D etc. from the outside.

As explained above, according to the information reproducing apparatus (or content assessment method, or content assessment apparatus) in the fourth embodiment, the decryption status signal D used to control whether to reproduce or disable reproduction is sent directly from the decryptor status monitor 4 to the output control means 8, and the output control means 8 directly decides whether or not the data signal decoded by the video decoder 5 is to be output as content. With this type of system configuration, it is difficult to tamper with the system, greatly reducing the risk of illegal decryption or reproduction of content. Because the system is configured in this way, if content that should have been protected by encryption has been illegally decrypted and converted to plaintext, the system can correctly detect the illegal decryption when the data stream is input, and can block the reproduction of the illegally processed content.

The technique of strengthening copyright protection by connecting the decryption status signal D to the video decoder 5 described in the third embodiment and the technique of strengthening copyright protection by connecting the decryption status signal D to the output control means 8 described in the fourth embodiment can be used in parallel to achieve even stronger copyright protection.

A mechanism to prevent illegal decryption in circumvention of copyright protection is then incorporated at two points, at the video decoder 5 and the output control means 8, so stronger copyright protection can be achieved.

Fifth Embodiment

Figure 8:
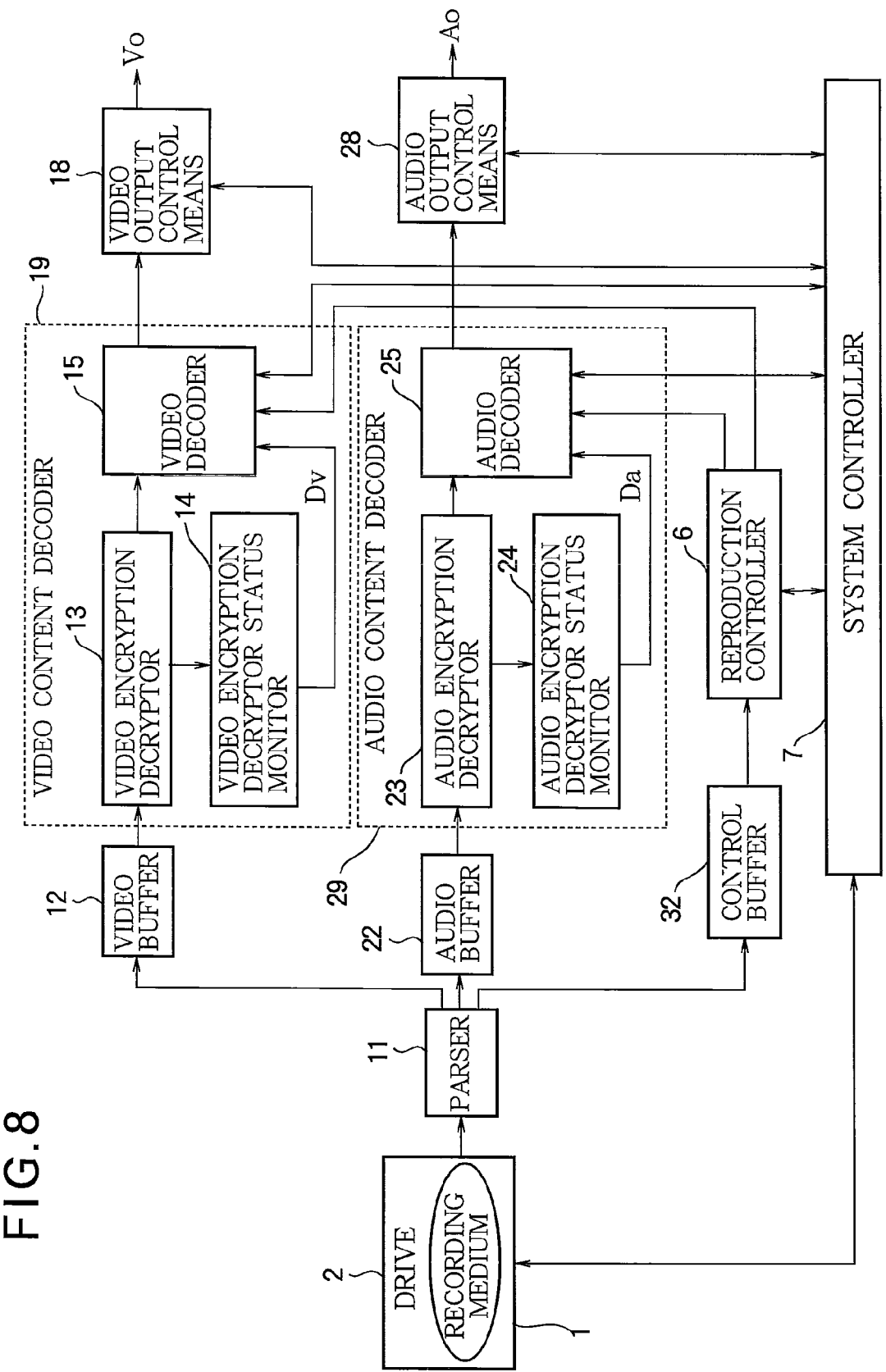
FIG. 8 is a block diagram showing the structure of an information reproducing apparatus according to a fifth embodiment of the invention.

FIG. 8 is a block diagram showing the structure of an information reproducing apparatus according to a fifth embodiment of the invention. The information reproducing apparatus according to the fifth embodiment of the invention shows the structure of the information reproducing apparatus described in the third embodiment in further detail. The description will accordingly proceed by comparison with the third embodiment. Blocks in FIG. 8 that are indicated by the same numerals as in FIG. 5 have the same functions.

In the information reproducing apparatus of the fifth embodiment, the system controller 7 that controls the operation of the entire apparatus controls the drive 2 as a reproducing means for reading content from the information recording medium 1, thereby reading the data of digital content. A parser 11 sorts the read-out digital content data according to type. Video data are sent from the parser 11 to a video buffer 12, audio data are sent from the parser 11 to an audio buffer 22, and control data are sent form the parser 11 to a control buffer 32.

The video data stored in the video buffer 12 are sent to a video encryption decryptor 13, which sequentially decodes (decrypts) the encrypted stream of the video content. A video encryption decryptor status monitor 14 receives an internal signal of the video encryption decryptor 13 and generates a video decryption status signal Dv indicating whether the video encryption decryptor 13 is performing the process of decrypting a copyright protection code. The video encryption decryptor 13 and the video encryption decryptor status monitor 14 correspond respectively to the decryptor 3 and the decryptor status monitor 4 in the first embodiment. The video decryption status signal Dv corresponds to the decryption status signal D described in the third embodiment, and indicates the value (state) Ed when the video encryption decryptor 13 is performing decryption processing and the value Nd when the video encryption decryptor 13 is not performing decryption processing.

The decrypted stream of video content output from the video encryption decryptor 13 is decoded (the encoded data are decoded) by the video decoder 15, which corresponds to the video decoder 5 in the first embodiment, and output as video data. The video output control means 18, corresponding to the output control means 8 in the third embodiment, reproduces and outputs the decoded data of the video content output from the video decoder 15, as the video part of the content. The content output signal output from the video output control means 18 is converted to video and output from a video display means such as a monitor (not shown).

The video decoder 15 carries out normal decoding processing to decode content for which the video decryption status signal Dv output from the video encryption decryptor status monitor 14 indicates the value Ed during decryption processing in the video encryption decryptor 13 (the video encryption decryptor status monitor 14 outputs a video decryption status signal Dv with the value Ed). It does not carry out processing, however, to decode content for which the video decryption status signal Dv output from the video encryption decryptor status monitor 14 indicates the value Nd during decryption processing in the video encryption decryptor 13 (the video encryption decryptor status monitor 14 outputs a video decryption status signal Dv with the value Nd). Thus, reproduction of video content that has been illegally decrypted can be disabled.

Since the three blocks including the video encryption decryptor 13, the video encryption decryptor status monitor 14, and the video decoder 15 are neighboring circuits used for a continuous series of digital data processing, as indicated by the dotted line surrounding them as a video content decoder 19 in FIG. 8, these blocks can easily be integrated in a single LSI chip to avoid illegal alteration or illegal monitoring for the purpose of tampering with the video decryption status signal Dv etc. from the outside.

The audio data stored in the audio buffer 22 are sent to the audio encryption decryptor 23, which sequentially decodes (decrypts) the encrypted stream of the audio content. The audio encryption decryptor status monitor 24 receives an internal signal of the audio encryption decryptor 23 and generates an audio decryption status signal Da indicating whether the audio encryption decryptor 23 is performing the processing of decrypting a copyright protection code. The audio encryption decryptor 23 and the audio encryption decryptor status monitor 24 correspond respectively to the decryptor 3 and the decryptor status monitor 4 in the first embodiment. The audio decryption status signal Da corresponds to the decryption status signal D described in the third embodiment, and indicates the value (state) Ed when the audio encryption decryptor 23 is performing decryption processing and the value Nd when the audio encryption decryptor 23 is not performing decryption processing.

The decrypted stream of the audio content output from the audio encryption decryptor 23 is decoded (the encoded data are decoded) by the audio decoder 25, corresponding to the video decoder 5 in the first embodiment, and output as audio data. The audio output control means 28, corresponding to the output control means 8 in the third embodiment, reproduces and outputs the decoded data of the audio content output from the audio decoder 25 as the audio part of the content. The content output signal output from the audio output control means 28 is converted to audio and output from an audio transducer means such as a loudspeaker (not shown).

The audio decoder 25 carries out normal decoding processing to decode content for which the audio decryption status signal Da output from the audio encryption decryptor status monitor 24 indicates the value Ed during decryption processing in the audio encryption decryptor 23 (the 24 outputs an audio decryption status signal Da with the value Ed). It does not carry out processing, however, to decode content for which the audio decryption status signal Da output from the audio encryption decryptor status monitor 24 indicates the value Nd during decryption processing in the audio encryption decryptor 23 (the audio encryption decryptor status monitor 24 outputs the audio decryption status signal Da with the value Nd). Thus, reproduction of audio content that has been illegally decrypted can be disabled.

Since the three blocks including the audio encryption decryptor 23, audio encryption decryptor status monitor 24, and audio decoder 25 are neighboring circuits used for a continuous series of digital data processing, as indicated by the dotted line surrounding them as an audio content decoder 29 in FIG. 8, they can be easily integrated in a single LSI chip to avoid illegal alteration or illegal monitoring for the purpose of tampering with the audio decryption status signal Da etc. from the outside.

The reproduction controller 6 receives navigation control information included in the digital content via the control buffer 32, and controls the reproduction of the content as in the third embodiment.

The technique of strengthening copyright protection by connecting the decryption status signal D to the output control means 8 described in the fourth embodiment can be applied to the fifth embodiment; alternatively, it can be used in parallel to achieve even stronger copyright protection. In this case, the video decryption status signal Dv is connected to the video output control means 18, and/or the audio decryption status signal Da is connected to the audio decryption status signal Da. Whether to use both the video decryption status signal Dv and audio decryption status signal Da or use only one of them can be determined by taking the load on the apparatus and effect on copyright protection into consideration.

As explained above, according to the information reproducing apparatus (or content assessment method, or content assessment apparatus) in the fifth embodiment, the video decryption status signal Dv and audio decryption status signal Da used to control whether to reproduce or disable reproduction are sent directly from the video encryption and audio encryption decryptor status monitors 16 and 24 to the video decoder 15 and audio decoder 25, respectively, and the video decoder 15 and audio decoder 25 decide directly from the decoding status signals Dv, Da whether or not to decode the video and audio coding of the data signals decrypted by the video encryption decryptor 13 and the audio encryption decryptor 23.

When the video decryption status signal Dv and audio decryption status signal Da used to control whether to enable or disable reproduction are sent directly from the video encryption decryptor status monitor 14 and the audio encryption decryptor status monitor 24 to the video output control means 18 and the audio output control means 28, respectively, the video output control means 18 and the audio output control means 28 decide directly from the decoding status signals Dv and Da whether or not to output the data signals decoded by the video decoder 15 and the audio decoder 25 as video and audio content, respectively.

With this type of system configuration it is difficult to tamper with the system, greatly reducing the risk of illegal decryption or illegal reproduction of content. Because the system is configured in this way, if content that should have been protected by encryption has been illegally decrypted and converted to plaintext, the system can correctly detect the illegal decryption when the data stream is input, and can block the reproduction of the illegally processed content.

In regard to points other than the above, the fifth embodiment is identical to the third and fourth embodiments.

Sixth Embodiment

Figure 9:
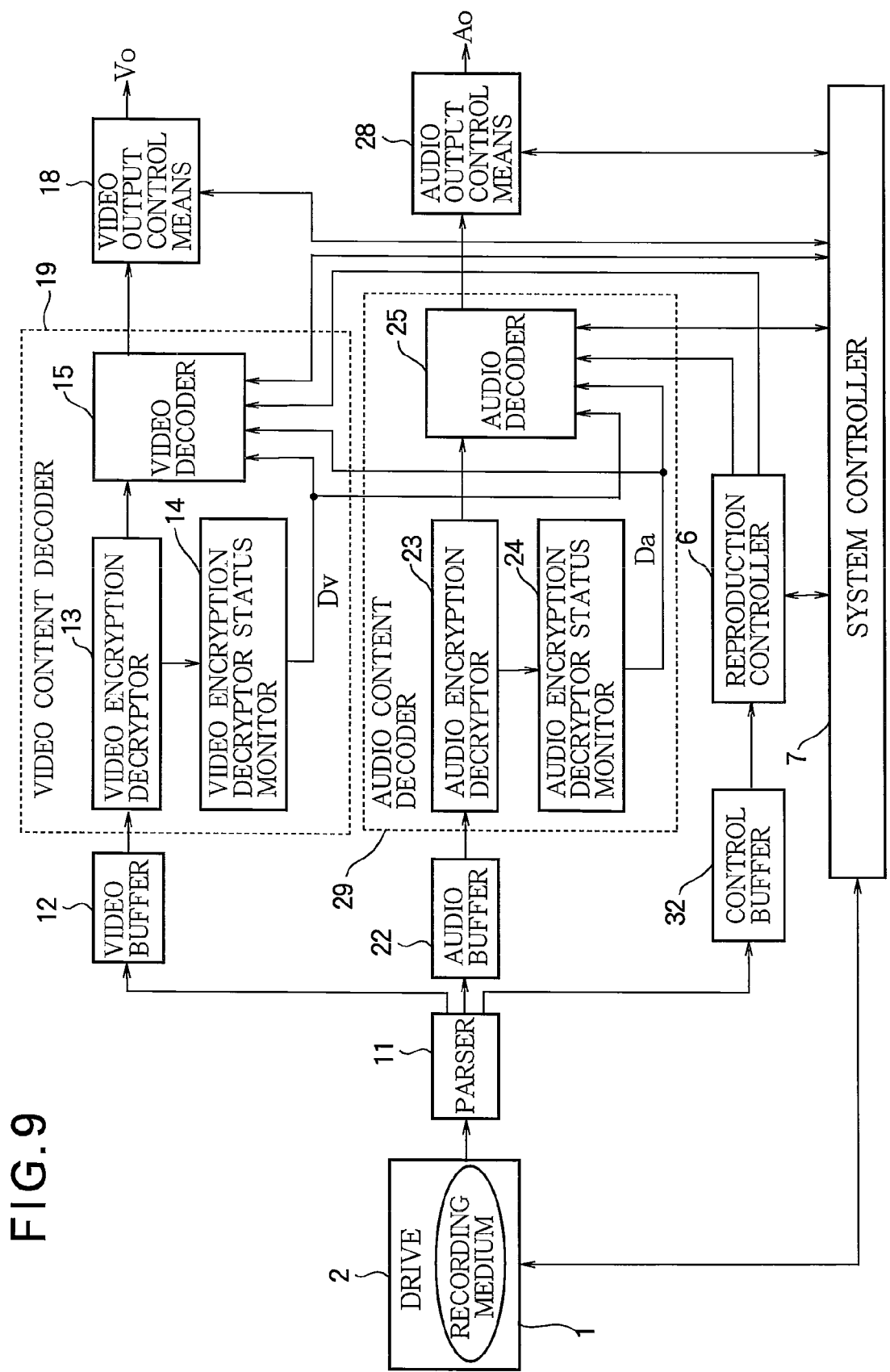
FIG. 9 is a block diagram showing the structure of an information reproducing apparatus according to a sixth embodiment of the invention.

FIG. 9 is a block diagram showing the structure of an information reproducing apparatus according to a sixth embodiment of the invention. The information reproducing apparatus according to the sixth embodiment of the invention is a partial modification of the information reproducing apparatus described in the fifth embodiment; blocks that are indicated by the same numerals in FIGS. 8 and 9 have the same functions. The following description will proceed by comparison with the fifth embodiment.

The difference between FIGS. 8 and 9 is the connection destination of the video decryption status signal Dv and the audio decryption status signal Da. In FIG. 8 the video decryption status signal Dv and audio decryption status signal Da are connected singly to the video decoder 15 and audio decoder 25, respectively, but in FIG. 9 each the video decryption status signal Dv and audio decryption status signal Da is connected to both the video decoder 15 and the audio decoder 25. In this configuration, for content for which the video decryption status signal Dv indicates the value Nd, not only the decoding of the video data code but also the decoding of the audio data code can be disabled. Similarly, for content for which the audio decryption status signal Da indicates the value Nd, not only the decoding of the audio data code but also the decoding of the video data code can be disabled. In other words, for content for which at least one of the video and the audio copyright protection has been illegally decrypted, both video and audio reproduction can be disabled to realize stronger copyright protection.

As a further variation, only one of the video decryption status signal Dv and the audio decryption status signal Da may be used. In this case, whether encoded video data and audio data should be decoded or not can be decided based on only one of the video and audio decryption status signals. In this case, only one encryption descriptor status monitor needs to be designed and implemented, so the invention can be practiced with less device and LSI design and manufacturing load.

As explained above, according to the information reproducing apparatus (or content assessment method, or content assessment apparatus) in the sixth embodiment, reproduction can be disabled unless enabled by both the video decryption status signal Dv and the audio decryption status signal Da, which control whether to reproduce or disable reproduction, so both video and audio reproduction of content can be disabled when either one of the video and audio copyright protections has been illegally decrypted, achieving stronger copyright protection.

Alternatively, reproduction of content can be enabled or disabled based on only one of the video decryption status signal Dv and the audio decryption status signal Da, so strengthened copyright protection can be obtained efficiently by using a method appropriate for the system specifications, such as by making the system configuration robust against tampering, or making the configuration easier to design and implement.

In regard to points other than the above, the sixth embodiment is identical to the third to fifth embodiments.

Seventh Embodiment

The seventh embodiment uses the same block structure as in FIG. 9, which shows the structure of the information reproducing apparatus described in the sixth embodiment above, but differs in some points from the operation of the sixth embodiment. The specific differences concern the processing that enables or disables video and audio decoding in the video decoder 15 and audio decoder 25 when they receive the video decryption status signal Dv and the audio decryption status signal Da.

Specifically, reproduction of both the video and audio content is enabled or disabled based only on, for example, the audio decryption status signal Da; in content for which the audio decryption status signal Da indicates the value Nd, the decoding of the audio data code is not disabled; only the decoding of the video data code is disabled.

Among the users who play illegitimate discs, there may be users who do not know that the discs have been illegitimately processed. If both video and audio reproduction were disabled here, this type of user might mistakenly think that something was wrong with the reproducing apparatus. Allowing reproduction of only the audio enables the video copyright to be protected but does not provide the full value of the content, thereby informing the user that the content is abnormal and limiting its use. For example, this scheme can be effectively used for content having a video copyright of high value but an audio copyright of relatively low value, such as content in which a video of an eminent actor is recorded with background music.

Conversely, it is possible to base the decision on reproducing both video and audio content only on the video decryption status signal Dv; for content for which the video decryption status signal Dv indicates the value Nd, the decoding of the video data code is not disabled; only the decoding of the audio data code is disabled. The relation between the degrees of video and audio copyright protection are opposite to the above, but similar effects are obtained. For example, this scheme can be effectively used for content having an audio copyright of high value but a video copyright of relatively low value, such as content in which a performance by an eminent musician is recorded with background video.

Which of the video and audio decryption status signals Dv, Da to use and whether to protect video or audio copyright in the seventh embodiment can be determined by considering the device design load and the purpose and effect of copyright protection.

Seven embodiments have been described above, but it will be appreciated that the ideas and techniques shown in the description of any one embodiment are not limited to that embodiment; they may be used in combination with the other embodiments.

For example, the internal structure of the decryptor 3 that decrypts encryption was described in the third embodiment, but this structure can also be applied in the first or second embodiment.

A method of protecting copyright by using the decryption status signals Dv, Da to control the enabling and disabling of the decoding processing for either the video or audio coding was described in the seventh embodiment, but these signals can of course also be used to protect copyright by enabling or disabling output from the output control means, as described in fourth embodiment.

Only copyright protection of video data was described in the first and second embodiments, but the same techniques as used for video data can be applied to audio data as described in fifth to seventh embodiments, or the techniques that use both the video and audio decryption status signals together for strong or flexible copyright protection of both video and audio can be combined with the first or second embodiment.

What is claimed is:

1. An information reproducing apparatus comprising:
a decryptor for decrypting encrypted stream information representing video or audio that has been coded and also encrypted;
a decryptor status monitor for receiving an internal signal of the decryptor and generating a decryption status signal indicating whether or not the decryptor is performing decryption processing based on the internal signal received from the decryptor; and
a decoder for decoding the stream information code, wherein the information reproducing apparatus is adapted to have the decoder perform decoding operations correctly only when the decryption status signal indicates that decryption processing is being performed.

2. The information reproducing apparatus of claim 1, wherein:
the stream information is intermittently encrypted; and
the decryptor status monitor determines whether or not the decryptor is performing decryption processing after observing the internal signal of the decryptor over an interval including at least one designated-for-encryption part of the stream information.

3. The information reproducing apparatus of claim 1, wherein:
the stream information is intermittently encrypted; and
the decoder decides whether or not to perform correct decoding processing after observing the decryption status signal output from the decryptor status monitor over an interval including at least one designated-for-encryption part of the stream information.

4. The information reproducing apparatus of claim 1, wherein:
the stream information includes stream information representing video and stream information representing audio;
the decryptor includes a video encryption decryptor for decrypting the stream information representing video, and an audio encryption decryptor for decrypting the stream information representing audio;
the decryptor status monitor includes a video decryptor monitor for receiving an internal signal of the video encryption decryptor and generating a video decryption status signal indicating whether or not the video encryption decryptor is performing decryption processing, and an audio decryptor monitor for receiving an internal signal of the audio encryption decryptor and generating an audio decryption status signal indicating whether or not the audio encryption decryptor is performing decryption processing;
each said decryptor sends a timing signal, internal to the decryptor, to the decryptor status monitor;
each said decryptor status monitor decides from the timing signal whether to make the decryption status signal indicate that decryption processing is being performed;
the decoder includes a video decoder for decoding the stream information representing video, and an audio decoder for decoding the stream information representing audio; and
the information reproducing apparatus is adapted to have the video decoder and the audio decoder perform correct decoding operations when the video decryption status signal and the audio decryption status signal both indicate that decryption is being performed.

5. The information reproducing apparatus of claim 1, wherein the internal signal is an internal timing signal.

6. An information reproducing apparatus comprising:
a decryptor for decrypting encrypted stream information representing video or audio that has been coded and also encrypted;
a decryptor status monitor for receiving an internal signal of the decryptor and generating a decryption status signal indicating whether or not the decryptor is performing decryption processing based on the internal signal received from the decryptor;
a decoder for decoding the stream information code; and
an output unit for output of the stream information decoded by the decoder, wherein the information reproducing apparatus is adapted so that the decoded stream information is output correctly from the output unit only when the decryption status signal indicates that decryption processing is being performed.

7. The information reproducing apparatus of claim 6, wherein:
the stream information is intermittently encrypted; and
the decryptor status monitor determines whether or not the decryptor is performing decryption processing after observing the internal signal of the decryptor over an interval including at least one designated-for-encryption part of the stream information.

8. The information reproducing apparatus of claim 6, wherein:
the stream information is intermittently encrypted; and
the decoder decides whether or not to perform correct decoding processing after observing the decryption status signal output from the decryptor status monitor over an interval including at least one designated-for-encryption part of the stream information.

9. The information reproducing apparatus of claim 6, wherein the internal signal is an internal timing signal.

10. An information reproducing method comprising:
using a decryptor to decrypt encoded and encrypted stream information representing video or audio;
receiving an internal signal of the decryptor and generating a decryption status signal indicating whether or not the decryptor is performing decryption processing based on the internal signal received from the decryptor; and
when using a decoder to decode the stream information, allowing the decoder to perform correct decoding operations only when the decryption status signal indicates that decryption processing is being performed.

11. The information reproducing apparatus of claim 10, wherein the internal signal is an internal timing signal.

12. An information reproducing method comprising:
using a decryptor to decrypt encoded and encrypted stream information representing video or audio;
receiving an internal signal of the decryptor and generating a decryption status signal indicating whether or not the decryptor is performing decryption processing based on the internal signal received from the decryptor;
using a decoder to decode the stream information; and
when outputting the stream information decoded by the decoder from an output unit, outputting the decoded stream information from the output unit correctly only when the decryption status signal indicates that decryption processing is being performed.

13. The information reproducing apparatus of claim 12, wherein the internal signal is an internal timing signal.

* * * * *